United States Patent
Kwon

(10) Patent No.: US 12,277,335 B2
(45) Date of Patent: Apr. 15, 2025

(54) STORAGE DEVICE

(71) Applicant: SK hynix Inc., Icheon-si Gyeonggi-do (KR)

(72) Inventor: Lee Hyun Kwon, Icheon-si Gyeonggi-do (KR)

(73) Assignee: SK hynix Inc., Icheon-si (KR)

( * ) Notice: Subject to any disclaimer, the term of this patent is extended or adjusted under 35 U.S.C. 154(b) by 10 days.

(21) Appl. No.: 18/305,229

(22) Filed: Apr. 21, 2023

(65) Prior Publication Data

US 2024/0160371 A1    May 16, 2024

(30) Foreign Application Priority Data

Nov. 16, 2022  (KR) .................. 10-2022-0153943

(51) Int. Cl.
   *G06F 3/06*         (2006.01)
(52) U.S. Cl.
   CPC .......... *G06F 3/0646* (2013.01); *G06F 3/0611* (2013.01); *G06F 3/064* (2013.01); *G06F 3/0679* (2013.01)
(58) Field of Classification Search
   None
   See application file for complete search history.

(56) References Cited

U.S. PATENT DOCUMENTS

| | | | |
|---|---|---|---|
| 10,133,490 B2 | 11/2018 | Sinclair et al. | |
| 2018/0211708 A1* | 7/2018 | Igahara | G11C 16/105 |
| 2020/0401515 A1* | 12/2020 | Liang | G06F 12/0253 |
| 2021/0240358 A1* | 8/2021 | Sharma | G11C 16/32 |
| 2021/0342262 A1* | 11/2021 | Muchherla | G06F 12/0246 |
| 2021/0365367 A1* | 11/2021 | Kim | G06F 3/064 |
| 2022/0164123 A1* | 5/2022 | Kim | G06F 3/0659 |
| 2022/0300190 A1* | 9/2022 | Amaki | G06F 3/0634 |
| 2023/0043733 A1* | 2/2023 | Luo | G06F 3/0644 |

FOREIGN PATENT DOCUMENTS

| | | |
|---|---|---|
| KR | 1020180012653 A | 2/2018 |
| KR | 1020210032222 A | 3/2021 |

* cited by examiner

*Primary Examiner* — Stephanie Wu
(74) *Attorney, Agent, or Firm* — WILLIAM PARK & ASSOCIATES LTD.

(57) ABSTRACT

A storage device includes a memory device including a plurality of memory blocks, and a controller configured to move first data from a single level cell (SLC) memory block to a first memory block having a target density lower than a maximum density based on a waiting time and to move second data from the SLC memory block to a memory block having the maximum density based on the waiting time.

12 Claims, 6 Drawing Sheets

STORAGE DEVICE

CROSS-REFERENCES TO RELATED APPLICATION

The present application claims priority under 35 U.S.C. § 119(a) to Korean application number 10-2022-0153943, filed on Nov. 16, 2022, in the Korean Intellectual Property Office, which is incorporated herein by reference in its entirety.

BACKGROUND

1. Technical Field

The present technology relates to a storage device including a memory device.

2. Related Art

A storage device may be configured to store data that is provided by an external device in response to a write request that the storage device receives from the external device. Furthermore, the storage device may be configured to provide the external device with data that has been stored in the storage device, in response to a read request that the storage device receives from the external device. The external device is an electronic device capable of processing data, and may include a computer, a digital camera, and a mobile phone. The storage device may be embedded in the external device or may be separate from but electrically connected to the external device. The storage device may include a semiconductor memory device for storing data.

SUMMARY

A storage device according to an embodiment of the present technology may include: a semiconductor memory device comprising a plurality of memory blocks, and a controller configured to move data from a single level cell (SLC) memory block to a first memory block having a target density lower than a maximum density based on a waiting time, defined below, and to move the same data from the SLC memory block to a memory block having the maximum density based on the waiting time.

In an embodiment, a storage device may include: a memory device including a plurality of memory blocks, and a controller configured to control the memory device to cause the memory device to various memory operations, which include storing, in a single level cell (SLC) memory block, write data corresponding to a write request when the SLC memory block includes an empty space; store the same write data in a first memory block having a higher density than the SLC memory block when the SLC memory block does not include an empty space and move the same data from the SLC memory block to a second memory block having a density lower than a maximum density based on a waiting time.

In an embodiment, a storage device may include: a semiconductor memory device comprising a plurality of memory blocks, and a controller configured to cause the memory device to store, in a single level cell (SLC) memory block, write data corresponding to a write request when the SLC memory block includes an empty space, store the write data in a first memory block having a higher density than the SLC memory block when the SLC memory block does not include the empty space, and move data from a second memory block having a density lower than a maximum density to a memory block having the maximum density based on a waiting time.

DETAILED DESCRIPTION

Hereinafter, embodiments of the present technology will be described in more detail with reference to the accompanying drawings.

Various embodiments are directed to a semiconductor storage device capable of efficiently using a limited capacity of a memory device and increasing the lifespan of the memory device by performing a background operation that improves storage device reliability.

The storage device according to an embodiment can efficiently use a limited capacity of a memory device and increase the lifespan of the memory device by performing an improved background operation.

Figure 1:
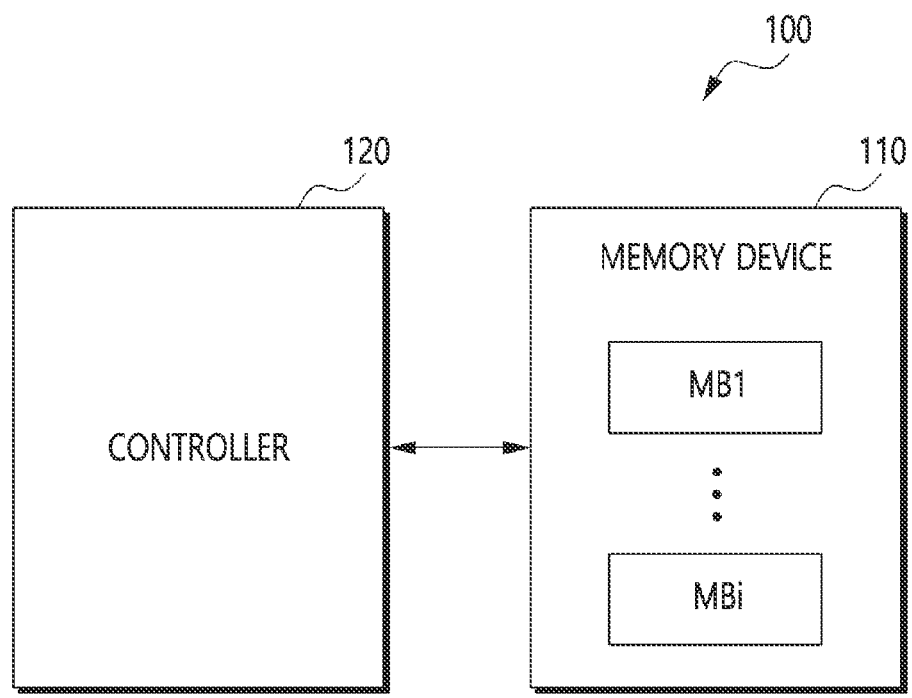
FIG. 1 is a block diagram illustrating a storage device according to an embodiment.

FIG. 1 is a block diagram illustrating a storage device 100 according to an embodiment.

As used herein, the term, "host device" should be construed as a device, a computer or camera for instance, to which other devices (peripherals), including memory devices are connected and which the host device controls. The storage device 100 depicted in FIG. 1 may be configured to store data that has been received from a host device, not shown in FIG. 1, in response to a write request that is also received by the storage device 100 from the host device. Furthermore, the storage device 100 may be configured to provide to a host device, data that was previously stored in the storage device, in response to a read request that is also received by the storage device 100 from the host device.

As shown in FIG. 1, the storage device 100 may include a memory device 110 and a controller 120. The storage device 100 may be a component of a personal computer memory card international association (PCMCIA) card, a smart media card, a memory stick, various multimedia cards (e.g., an MMC, an eMMC, an RS-MMC, and an MMC-micro), secure digital (SD) cards (e.g., SD, mini-SD, and micro-SD), universal flash storage (UFS), or a solid-state drive (SSD).

The storage device 100 is considered herein as having two, functionally different "portions," which are a controller portion and a memory device. They are typically located on the same semiconductor substrate but in an alternate embodiment the controller and memory device are on physically separate substrates and electrically coupled to each other.

The functionally different "portions" are considered herein as a controller "portion" or simply a controller identified in FIG. 1 by reference numeral "120" and a memory device portion or simply a memory device, identified in FIG. 1 by reference numeral "110." The memory device 110 of the storage device 100 may operate in response to control signals that the memory device 110 receives from the controller 120 of the storage device 100. Memory device 110 operations may include: a read operation, a write operation (in other words, a program operation), and an erase operation. Memory device 110 operations also include "move" operations, which are operations by which data already stored in a "first" type of memory block, is copied (moved) to a "second" and different type of memory block, in the same memory device 110. The memory device 110 may thus have several different memory block types. Each memory block type has a different data density and a different data write time. Stated another way, the time required to write a particular data into a first type of memory block having a first density is different than the time required to write the same data into a second and different type of memory block having a different density, both types of memory blocks being part of (formed in) the same physical memory device 110.

The memory device 110 may include a plurality of memory blocks MB1 to MBi. As will be described below, each memory block MB1 to MBi may be used as either a single level cell (SLC) memory block or an extra level cell (XLC) memory block, depending on the "density" of the memory block, which is to say, the number of bits stored in each memory cell, whether those memory cells are SLC or XLC. In this case, an XLC memory cell may be a multi-level cell (MLC) in which two bits are stored. The XLC memory cell may also be a triple level cell (TLC) in which three bits are stored, or, a quad level cell (QLC) in which four bits are stored. As the density of a memory block is increased, programming time for memory cells comprising the memory block, i.e., the time required to store data into a memory cell for the memory block also increases.

The memory device 110 may be implemented as NAND flash memory, 3D NAND flash memory, NOR flash memory, resistive random access memory (RRAM), phase change memory (PRAM), magnetoresistive random access memory (MRAM), ferroelectric random access memory (FRAM), and spin transfer torque random access memory (STT-RAM).

The controller 120 of the storage device 100 may control the overall operation of the storage device 100. Among other things, the controller 120 may control the memory device 110 to cause the memory device 110 to respond to various requests that the storage device 100 receives from a host device coupled to the storage device 100. (A host device is not shown in FIG. 1 in the interest of brevity.) For example, the controller 120 may cause the memory device 110 to store data transmitted to the storage device 100 by the host device, in response to a write request that the storage device 100 also receives from the host device. A request to write data and the data to be stored are thus dissimilar. The controller 120 may cause the memory device 110 to read data from the memory device 110 and thereafter transmit itself (the controller performs the actual data transmission) or cause the memory device 110 to transmit, i.e., output or send, the data to the host device, in response to a read request that the storage device 100 receives from a host device. The controller 120 may also cause data to be erased from the memory device 110.

In an embodiment, the controller 120 may cause the memory device 110 to store data received from a host device, into an SLC type memory block of the memory device 110, in response to a write request, also received from a host device. The controller 120 may alternatively store the received data in a type of memory block having a density that is higher than the density of SLC memory block, when the SLC memory block does not have an empty space large enough to store the data received from the host device.

Furthermore, the controller 120 may cause the memory device 110 to perform one or more management operations internally required by the controller 120, i.e., operations that are required by the storage device 100, independently of a host device. Stated another way, a management operation is an operation performed by the storage device 100 independently of and not necessarily requested by or required by a host device. For example, management operations may include a wear labeling operation, a garbage collection operation, and an erase operation. A management operation may also include a data movement operation, which is an operation that moves stored data, i.e., data that has already been stored in a first location in a first type of memory block, to a second and new location in a second and different type of memory block located in the same memory device 110. In an embodiment, management operations, including data movement operations, may also be performed in response to management operation requests received by the storage device 100 from a host device.

As used herein, the term, "waiting time" refers to the time between the storage device 120 completion a first request sent to the storage device 100 from a host device and the storage device's 120 receipt of a second request from the same host device or perhaps a different "host" device. In the embodiments disclosed and claimed herein, the controller 120 can perform a data movement operation by monitoring an idle state of a host device. The controller 120 may determine that the host device is in the idle state when a predetermined time has elapsed since the last request was received from the host device.

Specifically, the controller 120 may select a target density which is a criterion for the controller 120 to select a memory block to move data to. During a host device idle state, the controller 120 may cause the movement of a first data from a "first" SLC memory block to a different memory block having the target density lower than a maximum density based on a waiting time. The maximum density may be a maximum value among densities of memory blocks included in the memory device 110. The controller 120 may move second data from the SLC memory block to a memory block having the maximum density based on the same or a different waiting time. More specifically, the controller 120 may cause the movement or relocation of the first data by determining whether the waiting time has reached a first threshold time, and may move the second data by determining whether the waiting time has reached a second threshold time longer than the first threshold time. The controller 120 may not move the first data before the waiting time reaches the first threshold time and may not move the second data before the waiting time reaches the second threshold time.

In an embodiment, the controller 120 may increase a target density after moving first data, and may move the first data from a first memory block to the third memory block having the increased target density based on a memory waiting time. As stated above, waiting time may be the time between when the memory device 110 completes a request that the storage device 100 receives from a host device and when a new request is received from the host device. For example, the first target density may be 2, and a target density may be increased by 1. In this case, the first data may be sequentially moved from an SLC memory block to an MLC memory block, and a TLC memory block based on the waiting time and the memory waiting time.

In an embodiment, the controller 120 may increase a target density when a first memory block does not have an empty space capable of storing first data, and may move the first data from an SLC memory block to the third memory block having the increased target density.

In summary, the controller 120 can move data to a memory block having a low density and thus having a short programming time when wait time is short, (i.e., when a waiting time reaches a first threshold time). Furthermore, the controller 120 may expect that an idle time of the host device will be long when waiting times are long i.e., when a waiting time reaches a second threshold time. Accordingly, the controller 120 can skip a movement of unnecessary data and maximize operation performance, by immediately moving data to a memory block having a maximum density although a longer program time is required. Furthermore, if data is immediately moved to a memory block having a maximum density, a garbage collection operation can be performed or accelerated because many memory regions are invalidated at once. As a result, the controller 120 can provide improved operation performance by more efficiently using limited memory blocks MB of the memory device 110 and increasing the lifespan of the memory device 110.

Figure 2:
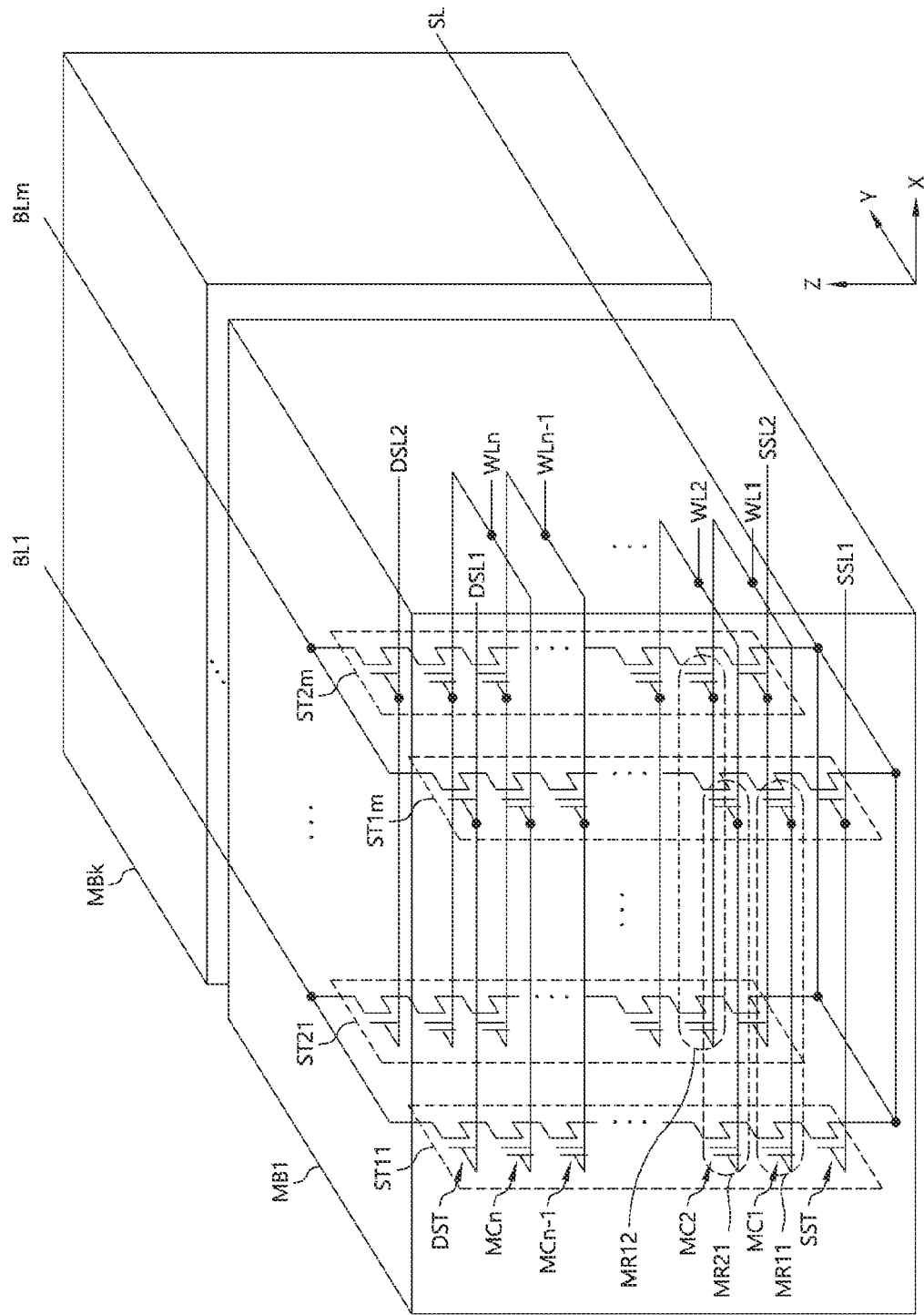
FIG. 2 is a circuit diagram illustrating a memory block according to an embodiment.

FIG. 2 is a circuit diagram illustrating the memory block MB1 according to an embodiment. Each of the memory blocks MB1 to MBi that are included in the memory device 110 depicted in FIG. 1, may be constructed similarly to the memory block MB1 in FIG. 2.

Referring to FIG. 2, the memory block MB1 may include strings ST11 to ST1m and ST21 to ST2m. Each of the strings ST11 to ST1m and ST21 to ST2m may be extended in a perpendicular direction (i.e., a Z direction). m strings may be arranged within the memory block MB1 in a row direction (i.e., an X direction). In FIG. 2, two strings have been illustrated as being arranged in a column direction (i.e., a Y direction), but this is for convenience of description. Three or more strings may be arranged in the column direction (i.e., the Y direction).

The strings ST11 to ST1m and ST21 to ST2m may be constructed identically. For example, the string ST11 may include a source selection transistor SST, memory cells MC1 to MCn, and a drain selection transistor DST that are connected in series between a source line SL and a bit line BL1. A source of the source selection transistor SST may be connected to the source line SL. A drain of the drain selection transistor DST may be connected to the bit line BL1. The memory cells MC1 to MCn may be connected in series between the source selection transistor SST and the drain selection transistor DST.

The gates of the source selection transistors of strings that are arranged in the same row may be connected to the same source selection line. For example, the gates of source selection transistors of the strings ST11 to ST1m in a first row may be connected to a source selection line SSL1. For example, the gates of source selection transistors of the strings ST21 to ST2m in a second row may be connected to a source selection line SSL2. As another embodiment, the source selection transistors of the strings ST11 to ST1m and ST21 to ST2m may be connected to one source selection line in common.

The gates of the drain selection transistors of strings that are arranged in the same row may be connected to the same drain selection line. For example, the gates of drain selection transistors of the strings ST11 to ST1m in the first row may be connected to a drain selection line DSL1. For example, the gates of drain selection transistors of the strings ST21 to ST2m in the second row may be connected to a drain selection line DSL2.

Strings that are arranged in the same column may be connected to the same bit line. For example, the strings ST11 and ST21 in a first column may be connected to the bit line BL1. For example, the strings ST1m and ST2m in an m-th column may be connected to the bit line BLm.

The gates of memory cells at the same location in the perpendicular direction may be connected to the same word line. For example, in the strings ST11 to ST1m and ST21 to ST2m, memory cells at the same location in the perpendicular direction to the memory cell MC1 may be connected to a word line WL1.

Memory cells that have been connected to the same word line in the same row, among memory cells, may construct one memory region. For example, memory cells that have been connected to the word line WL1 in the first row may construct one memory region MR11. For example, memory cells that have been connected to the word line WL1 in the second row may construct one memory region MR12. For example, memory cells that have been connected to a word line WL2 in the first row may construct one memory region MR21. Each word line may be connected to a plurality of memory regions depending on the number of rows. Memory cells that construct one memory region may be simultaneously programmed.

In an embodiment, the memory block MB1 may be further connected to one or more dummy word lines other than the word lines WL1 to WLn. In this case, the memory block MB1 may further include dummy memory cells that have been connected to dummy word lines.

A memory cell in which 1 bit is stored may be denoted as an SLC. A memory region and a memory block each including SLCs may be denoted as an SLC memory region and an SLC memory block, respectively. A memory cell in which a plurality of bits is stored may be denoted as an XLC. A memory region and a memory block each including XLCs may be denoted as an XLC memory region and an XLC memory block, respectively.

One memory region including memory cells in each of which k bits are stored may logically include k sub-regions, in other words, pages. For example, a TLC memory region may logically include three pages, that is, the least significant bit (LSB) page (or a page having the lowest level) in which the LSB is stored, a central significant bit (CSB) page (or a page having an intermediate level) in which a CSB is stored, and the most significant bit (MSB) page (or a page having the highest level) in which the MSB is stored. For example, a QLC memory region may logically include four pages, that is, an LSB page in which the LSB is stored, a first CSB page (or a page having a first intermediate level) in which a first CSB is stored, a second CSB page (or a page having a second intermediate level) in which a second CSB is stored, and an MSB page in which the MSB is stored.

The memory device 110 may simultaneously perform a program operation on a plurality of pages that is included in one memory region, under the control of the controller 120. The memory device 110 may perform a program operation only on one page that is included in one memory region, under the control of the controller 120.

As more bits per memory cell are stored, a longer time may be required to perform a write operation, i.e., a program operation, on a memory region. The reason for this is that the memory device 110 has to perform a finer and more complicated operation in order to store more bits per memory cell. For example, among write operations for SLC, MLC, TLC, and QLC memory regions, the time required to perform the write operation on the SLC memory region may be the shortest, whereas the time required to perform the write operation on the QLC memory region may be the longest.

Figure 3:
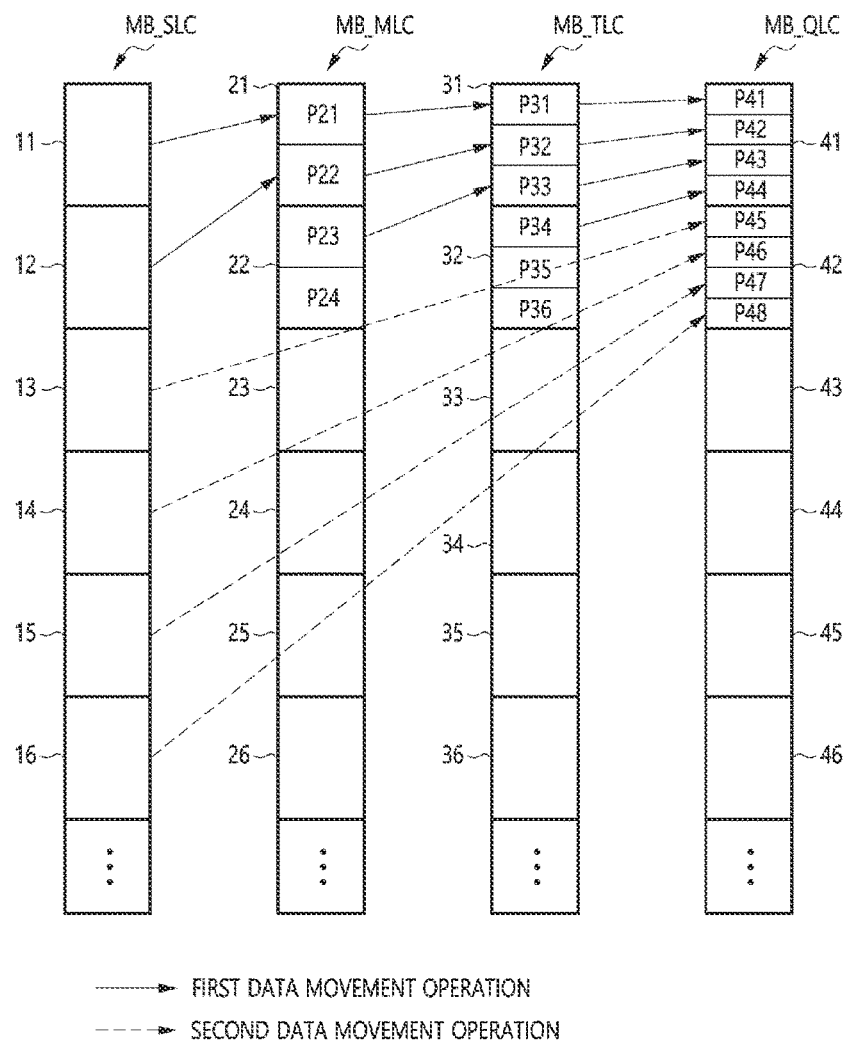
FIG. 3 is a diagram for describing a method of moving, by the controller in FIG. 1, data based on a waiting time according to an embodiment.

FIG. 3 is a diagram for describing a method of moving data in a memory device 110, effectuated by the controller 120 in FIG. 1, data according to an embodiment.

Referring to FIG. 3, a maximum density of a memory block that is provided by the memory device 110 may be 4, for example. Accordingly, a memory device 110 with a maximum density of 4 may include an SLC memory block MB_SLC, and an MLC memory block MB_MLC, and a TLC memory block MB_TLC, and a QLC memory block MB_QLC.

The controller 120 may measure a waiting time and perform a first data movement operation when a waiting time reaches a first threshold time. The first data movement operation may be an operation for sequentially moving data to the SLC memory block MB_SLC, the MLC memory block MB_MLC, the TLC memory block MB_TLC, and the QLC memory block MB_QLC. The first data movement operation may be an operation for rapidly moving data to a memory block having a higher density, by preferentially performing a program operation having a short execution time.

Specifically, when the waiting time reaches the first threshold time after the processing of a request that has been received from the host device is completed, the controller 120 may move data from the SLC memory block MB_SLC to the MLC memory block MB_MLC. The controller 120 may move, to one MLC memory region 21, data that has been stored in a maximum of two memory regions 11 and 12 of the SLC memory block MB_SLC. The memory device 110 may perform a program operation on the MLC memory region 21 in an MLC program mode in which two bits per memory cell may be stored. In an embodiment, the controller 120 may move data from the SLC memory block MB_MLC to a predetermined number of MLC memory regions. When the memory device 110 completes its operation, the controller 120 may start the measurement of a memory waiting time.

Furthermore, when the memory waiting time reaches a first threshold time, the controller 120 may move data from the MLC memory block MB_MLC to the TLC memory block MB_TLC. The controller 120 may move, to one TLC memory region 31, data that has been stored in a maximum of three pages P21, P22, and P23 of the MLC memory block MB_MLC. The memory device 110 may perform a program operation on the TLC memory region 31 in a TLC program mode in which three bits per memory cell may be stored. In an embodiment, the controller 120 may move data from the MLC memory block MB_MLC to a predetermined number of TLC memory regions. When the memory device 110 completes its operation, the controller 120 may initialize the memory waiting time and start measurement of the memory waiting time.

Furthermore, when the memory waiting time reaches the first threshold time again, the controller 120 may move data from the TLC memory block MB_TLC to the QLC memory block MB_QLC. The controller 120 may move, to one QLC memory region 41, data that has been stored in a maximum of four pages P31, P32, P33, and P34 of the TLC memory block MB_TLC. The memory device 110 may perform a program operation on the QLC memory region 41 in a QLC program mode in which four bits per memory cell may be stored. In an embodiment, the controller 120 may move data from the TLC memory block MB_TLC to a predetermined number of QLC memory regions.

Furthermore, the controller 120 may perform a second data movement operation when the waiting time reaches a second threshold time. The second data movement operation may be an operation for immediately moving data from the SLC memory block MB_SLC having a minimum density to the QLC memory block having a maximum density. The second threshold time may be longer than the first threshold time.

Specifically, the controller 120 may move, to one QLC memory region 42, data that has been stored in a maximum of four memory regions 13 to 16 of the SLC memory block MB_SLC. The second data movement operation may perform a garbage collection operation for the SLC memory block MB_SLC by invalidating many memory regions through one execution of the second data movement operation.

In the first data movement operation illustrated in FIG. 3, the data is moved from a first memory block MB_SLC to a different memory block MB_MLC having a data density increased by 1, as compared to the previous memory block MB_SLC. However, according to an embodiment, an incremental density increase may be greater than 1 depending on how the controller 120 is configured or programmed to operate. A "setting" of the controller 120 can thus determine how data is moved between memory block types. For example, the data movement may skip the TLC memory block MB_TLC, and may be sequentially moved from the SLC memory block MB_SLC to the MLC memory block MB_MLC and the QLC memory block MB_QLC. For example, the data may skip the MLC memory block MB_MLC, and may be sequentially moved from the SLC memory block MB_SLC to the TLC memory block MB_TLC and the QLC memory block MB_QLC. And for claim construction purposes, it is not necessary to perform data movements between different types of memory blocks, i.e., memory blocks with different densities in any particular order or sequence. For claim construction purposes, data movements between memory blocks with different densities can be performed selectively i.e., the controller 120 can select a type of memory block to which data is to be moved. Moreover, data movements can be performed asynchronously; it is also not necessary to perform any data of the disclosed data movements at a specific time or relative to a time.

Furthermore, in the second data movement operation illustrated in FIG. 3 by the dotted or "broken" leader lines, data is moved from the SLC memory block having the minimum density to the QLC memory block having the maximum density of 4. However, according to an embodiment, the data may be moved from a memory block having a density lower than the maximum density to the QLC memory block having the maximum density depending on the setting of the controller 120.

Figure 4:
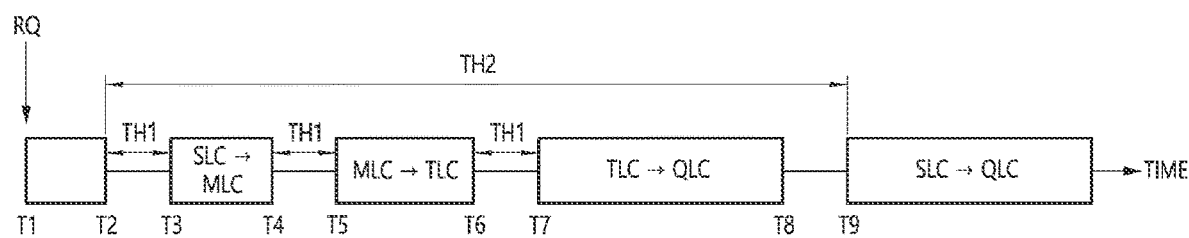
FIG. 4 is a diagram for describing a method of moving, by the controller in FIG. 1, data based on a first threshold time and second threshold time of a waiting time according to an embodiment.

FIG. 4 is a diagram describing a method of moving, by the controller 120 in FIG. 1, data based on a first threshold time and second threshold time of a waiting time according to an embodiment.

Referring to FIG. 4, at timing T1, the controller 120 may receive a request RQ from the host device, and may control the memory device 110 to perform an operation corresponding to the request RQ. At timing T2, the controller 120 may complete the processing of the request RQ that has been received from the host device. For example, timing T2 may be the time when a response to the request RQ is transmitted to the host device. For example, timing T2 may be the time when the memory device 110 completes the operation corresponding to the request RQ. The controller 120 may measure a waiting time from timing T2.

At timing T3, the controller 120 may determine that the waiting time has reached a first threshold time TH1. The controller 120 may move data from the SLC memory block to the MLC memory block. At timing T4, the controller 120 may measure a memory waiting time when the memory device 110 completes a program operation for the MLC memory block.

At timing T5, the controller 120 may determine that the memory waiting time has reached the first threshold time TH1. The controller 120 may move the data from the MLC memory block to the TLC memory block. At timing T6, the controller 120 may measure the memory waiting time when the memory device 110 completes a program operation for the TLC memory block.

At timing T7, the controller 120 may determine that the memory waiting time has reached the first threshold time TH1. The controller 120 may move data from the TLC memory block to the QLC memory block. At timing T8, the memory device 110 may complete a program operation for the QLC memory block.

At timing T9, the controller 120 may determine that the waiting time has reached a second threshold time TH2. The controller 120 may move data from the SLC memory block to the QLC memory block. For example, the second threshold time TH2 may be set to be longer than the time (i.e., from timing T2 to timing T8) that is required for the same data to be sequentially moved from the SLC memory block to the MLC, TLC, or QLC memory blocks through the first data movement operation. However, according to an embodiment, the length of the second threshold time TH2 is not limited to the example.

Figure 5:
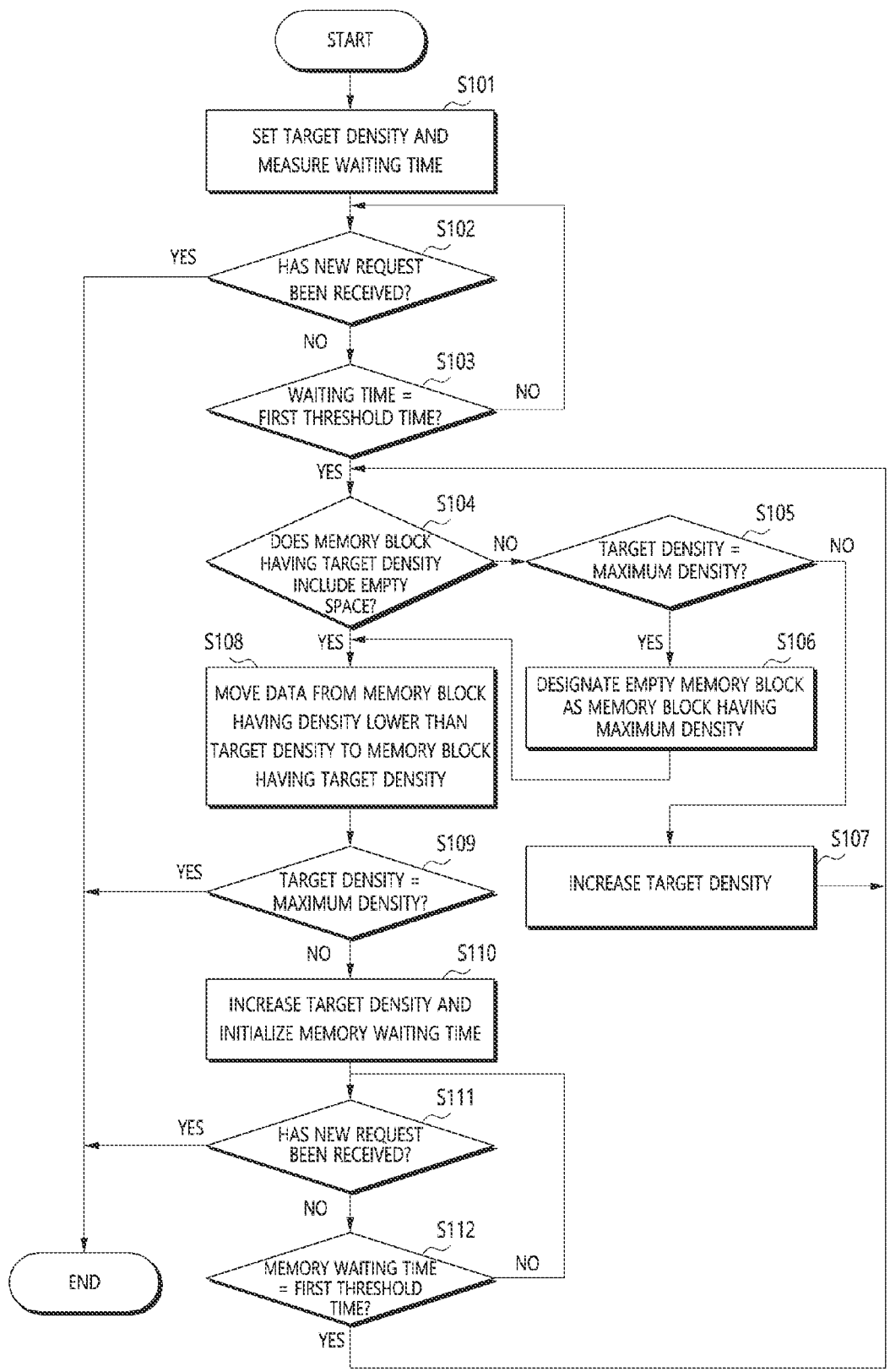
FIG. 5 is a flowchart illustrating an operating method of the controller in FIG. 1 according to an embodiment.

FIG. 5 is a flowchart illustrating an operating method of the controller 120 in FIG. 1 according to an embodiment. A procedure in FIG. 5 may be for performing the first data movement operation that has been described with reference to FIG. 3. The procedure in FIG. 5 may be performed after the controller 120 completes the processing of a request that has been received from the host device.

Referring to FIG. 5, in operation S101, the controller 120 may set a target density, and may measure a waiting time. The target density may be the density of a memory block to which data will be moved and in which the data will be newly stored. The target density that is set in operation S101 may be 2 (i.e., the density of the MLC memory block), but an embodiment is not limited thereto.

In operation S102, the controller 120 may determine whether a new request has been received from the host device. When it is determined that the new request has been received, the procedure may be terminated. When it is determined that a new request has not been received, the procedure may proceed to operation S103.

In operation S103, the controller 120 may determine whether the waiting time has reached a first threshold time. When it is determined that the waiting time has not reached the first threshold time, the procedure may proceed to operation S102. When it is determined that the waiting time has reached the first threshold time, the procedure may proceed to operation S104.

In operation S104, the controller 120 may determine whether a memory block having the target density includes an empty space capable of storing data. When it is determined that the memory block having the target density includes the empty space, the procedure may proceed to operation S108. When it is determined that the memory block having the target density does not include the empty space, the procedure may proceed to operation S105.

In operation S105, the controller 120 may determine whether the target density is a maximum density. When it is determined that the target density is the maximum density, the procedure may proceed to operation S106. When it is determined that the target density is not the maximum density, the procedure may proceed to operation S107.

In operation S106, the controller 120 may designate an empty memory block or a free memory block as a memory block having a maximum density. A new memory block having the maximum density becomes a memory block having a target density. The procedure may proceed to operation S108.

In operation S107, the controller 120 may increase the target density. An increment of the target density may be a natural number equal to or greater than 1. Thereafter, the procedure may proceed to operation S104. The controller 120 may determine whether a memory block having the increased target density includes an empty space capable of storing data.

In operation S108, the controller 120 may move data from a memory block having a density lower than the target density to the memory block having the target density. The density that is lower than the target density may be a density that is smaller than the target density by 1, for example. However, according to an embodiment, a difference between the densities is not limited to 1. The controller 120 may not move invalid data, and may move only valid data to the memory block having the target density.

In operation S109, the controller 120 may determine whether the target density is a maximum density. When it is determined that the target density is the maximum density, the procedure may be terminated. When it is determined that the target density is not the maximum density, the procedure may proceed to operation S110.

In an embodiment, in operation S109, the controller 120 may determine whether the target density is a predetermined density lower than the maximum density. In this case, in the first data movement operation, data may be moved up to only a memory block having the predetermined density lower than the maximum density.

In operation S110, the controller 120 may increase the target density, and may initialize a memory waiting time. An increment of the target density may be a natural number equal to or greater than 1.

In operation S111, the controller 120 may determine whether a new request has been received from the host device. When it is determined that the new request has been received, the procedure may be terminated. When it is determined that a new request has not been received, the procedure may proceed to operation S112.

In operation S112, the controller 120 may determine whether the memory waiting time has reached the first threshold time. When it is determined that the memory waiting time has not reached the first threshold time, the procedure may proceed to operation S111. When it is determined that the memory waiting time has reached the first threshold time, the procedure may proceed to operation S104.

Figure 6:
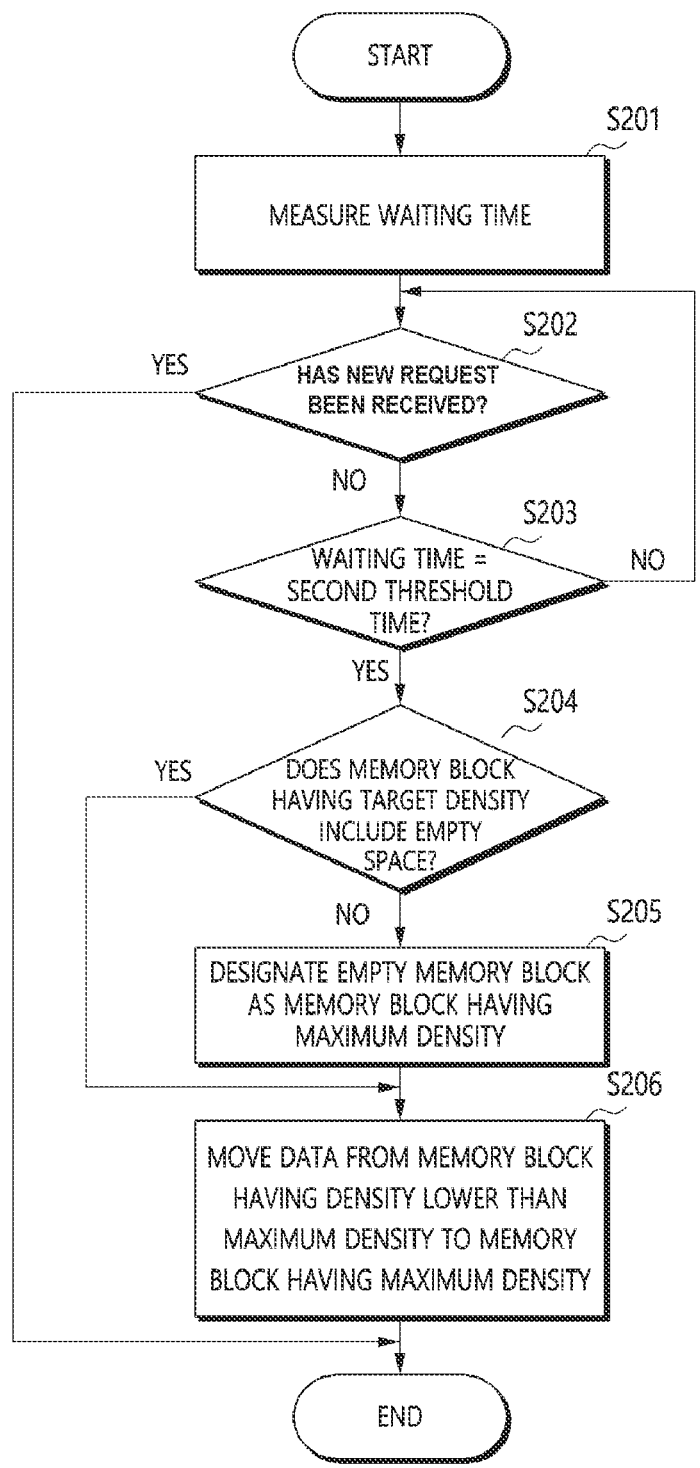
FIG. 6 is a flowchart illustrating an operating method of the controller in FIG. 1 according to an embodiment.

FIG. 6 is a flowchart illustrating an operating method of the controller 120 in FIG. 1 according to an embodiment. A procedure in FIG. 6 may be for performing the second data movement operation that has been described with reference to FIG. 3. The procedure in FIG. 6 may be performed after the controller 120 completes the processing of a request that has been received from the host device. The procedure in FIG. 6 may be performed in parallel to the procedure in FIG. 5.

Referring to FIG. 6, in operation S201, the controller 120 may measure a waiting time.

In operation S202, the controller 120 may determine whether a new request has been received from the host device. When it is determined that the new request has been received, the procedure may be terminated. When it is determined that a new request has not been received, the procedure may proceed to operation S203.

In operation S203, the controller 120 may determine whether a waiting time has reached a second threshold time. When it is determined that the waiting time has not reached the second threshold time, the procedure may proceed to operation S202. When it is determined that the waiting time has reached the second threshold time, the procedure may proceed to operation S204.

In operation S204, the controller 120 may determine whether a memory block having a maximum density includes an empty space capable of storing data. When it is determined that the memory block having the maximum density includes the empty space, the procedure may proceed to operation S206. When it is determined that the memory block having the maximum density does not include the empty space, the procedure may proceed to operation S205.

In operation S205, the controller 120 may designate an empty memory block or a free memory block as a memory block having a maximum density.

In operation S206, the controller 120 may move data from a memory block having a density lower than the maximum density to the memory block having the maximum density. The controller 120 may not move invalid data, and may move only valid data to the memory block having the maximum density. The memory block having the density lower than the maximum density may be the SLC memory block.

Figure 7:
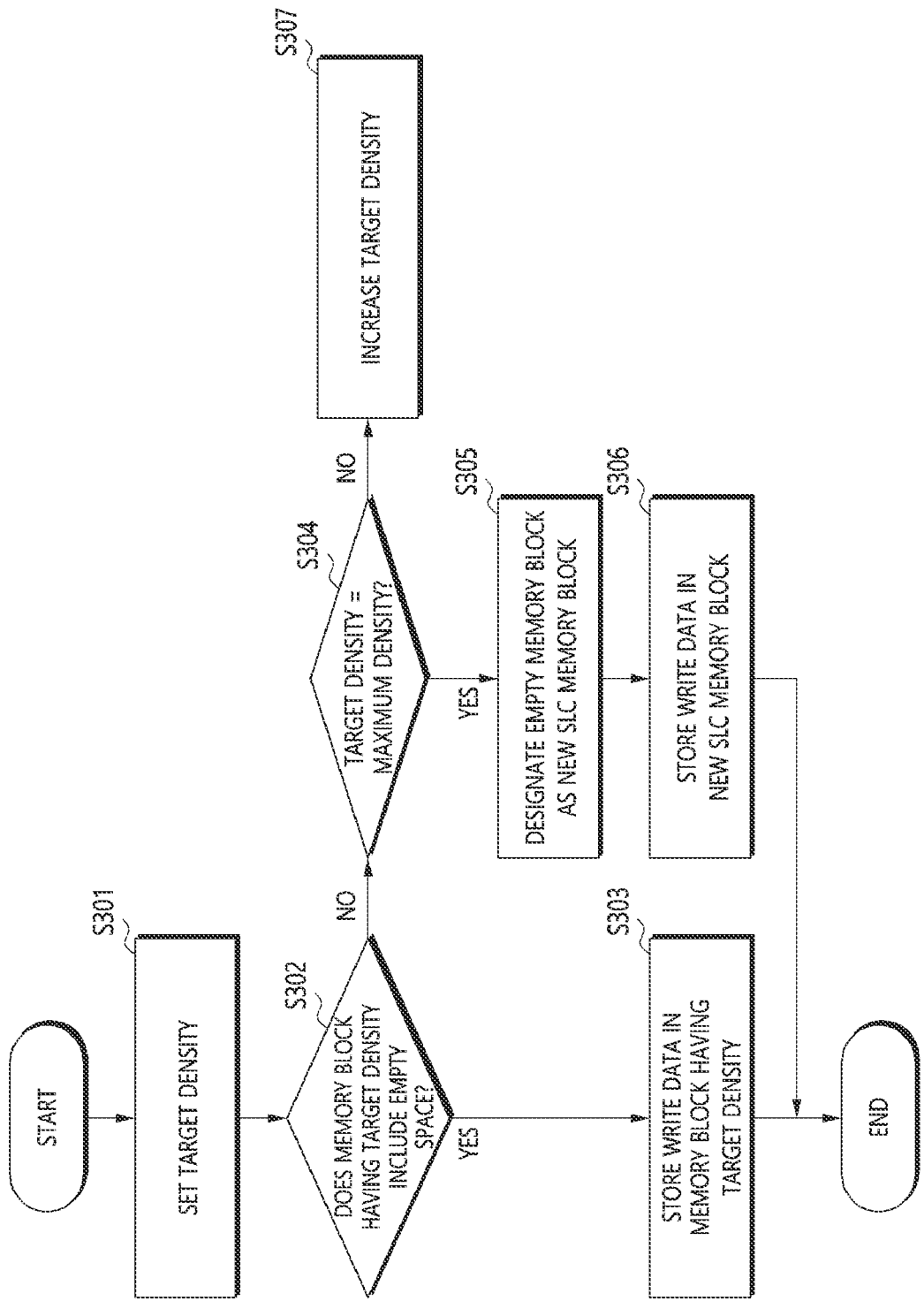
FIG. 7 is a flowchart illustrating a method of processing, by the controller in FIG. 1, a write request that has been received from a host device according to an embodiment.

FIG. 7 is a flowchart illustrating a method of processing, by the controller 120 in FIG. 1, a write request that has been received from the host device according to an embodiment.

Referring to FIG. 7, in operation S301, the controller 120 may set a target density. The target density may be the density of a memory block in which write data corresponding to a write request will be stored. The target density that is set in operation S301 is 1 (i.e., the density of the SLC memory block), but an embodiment is not limited thereto.

In operation S302, the controller 120 may determine whether a memory block having the target density includes an empty space capable of storing the write data. When it is determined that the memory block having the target density includes the empty space, the procedure may proceed to operation S303. When it is determined that the memory block having the target density does not include the empty space, the procedure may proceed to operation S304.

In operation S303, the controller 120 may store the write data corresponding to the write request in the memory block having the target density. When the memory block having the target density is the SLC memory block, the memory device 110 may store the write data in the SLC memory block in the SLC program mode. When the memory block having the target density is the XLC memory block, the memory device 110 may store the write data in the XLC memory block in the XLC program mode.

In operation S304, the controller 120 may determine whether the target density is a maximum density. When it is determined that the target density is not the maximum density, the procedure may proceed to operation S307. When it is determined that the target density is the maximum density, the procedure may proceed to operation S305.

In operation S305, the controller 120 may designate an empty memory block or a free memory block as a new SLC memory block.

In operation S306, the controller 120 may store, in the new SLC memory block, the write data corresponding to the write request.

In operation S307, the controller 120 may increase the target density. An increment of the target density may be a natural number equal to or greater than 1. The procedure may proceed to operation S302. The controller 120 may determine whether a memory block having the increased target density includes an empty space capable of storing the write data.

In summary, the controller 120 may preferentially select a memory block having a short program time and having a low density in order to store write data corresponding to a write request. Accordingly, the controller 120 can rapidly transfer a response to the write request to the host device. Furthermore, when the memory block having the low density does not include an empty space capable of storing the write data, the controller 120 can prohibit a data movement operation by storing the write data in a memory block having a higher density.

For the sake of completeness, those of ordinary skill in the semiconductor memory art should understand that the controller 120 can be embodied as combinational and sequential logic devices, appropriately connected to provide or function as a finite state machine. It can also be embodied as a processor that is "configured" i.e., programmed to control the memory device 110 as described above. And for claim construction purposes, memory operation times denominated herein as short, shorter, long or longer long are relative to each other. Memory operation times are thus qualitative, not quantitative.

The above description is merely a description of the technical spirit of the present disclosure, and those skilled in the art may change and modify the present disclosure in various ways without departing from the essential characteristic of the present disclosure. Furthermore, the embodiments described in the present disclosure should not be construed as limiting the technical spirit of the present disclosure, but should be construed as describing the technical spirit of the present disclosure. The technical spirit of the present disclosure is not restricted by the embodiments. The range of protection of the present disclosure should be construed based on the following claims, and all of technical spirits within an equivalent range of the present disclosure should be construed as being included in the scope of rights of the present disclosure.

What is claimed is:

1. A storage device comprising:
a memory device comprising a plurality of memory blocks; and
a control circuit configured to:
measure a wait time from a completion of processing a request received from an external device;
move first data from a single level cell (SLC) memory block to a first memory block having a target density lower than a maximum density by determining whether the waiting time has reached a first threshold time; and
move second data that is larger than the first data from the SLC memory block to a memory block having the maximum density by determining whether the waiting time has reached a second threshold time longer than the first threshold time.

2. The storage device according to claim 1, wherein the control circuit is configured to:
increase the target density after moving the first data to the first memory block, and
move third data, including the first data and having a larger amount than the first data, from the first memory block to a third memory block having the increased target density based on a memory waiting time.

3. The storage device according to claim 2, wherein the memory waiting time is a time that has elapsed before a new request is received from an external device, from a time when it is determined that the memory device has completed storing the first data in the first memory block.

4. The storage device according to claim 1, wherein the control circuit is configured to:
increase the target density when the first memory block does not include an empty space capable of storing the first data, and
move the first data from the SLC memory block to a third memory block having the increased target density.

5. The storage device according to claim 1, wherein the control circuit is configured to cause the memory device to store in the SLC memory block, write data corresponding to a write request, in response to the write request that has been received by the storage device from an external device.

6. The storage device according to claim 5, wherein the control circuit is configured to cause the memory device to store write data in a memory block having a higher density than the SLC memory block, when the SLC memory block does not include an empty space capable of storing the write data.

7. A storage device comprising:
a memory device comprising a plurality of memory blocks, predetermined ones of the memory blocks being different memory block types; and
a control circuit configured to:
store, in a single level cell (SLC) memory block, write data corresponding to a write request when the SLC memory block comprises an empty space, move first data stored in a first number of SLC memory regions in the SLC memory block to a first memory block having a density lower than a maximum density before a waiting time reaches a threshold time, and
in response to the waiting time reaching the threshold time, move second data stored in a second number of SLC memory regions in the SLC memory block, which is greater than the first number, to a second memory block having the maximum density.

8. The storage device according to claim 7, wherein the control circuit is configured to
a memory block having a density higher than the SLC memory block when the SLC memory block does not include the empty space.

9. The storage device according to claim 7, wherein the waiting time is a time that has elapsed before a new request is received from an external device, from a time when it is determined that a processing of a request that has been received from the external device has been completed.

10. The storage device according to claim 7, wherein the control circuit is configured to move third data, including the first data and having a larger amount than the first data, from the first memory block to a third memory block having a higher density than the first memory block, based on a memory waiting time, after moving the first data and before the waiting time reaches the threshold time.

11. The storage device according to claim 10, wherein the memory waiting time is a time that has elapsed before a new request is received from an external device, from a time when it is determined that the memory device has completed storing the first data in the first memory block.

12. The storage device according to claim 7, wherein the control circuit is configured to move the first data from the first number of SLC memory regions to a third memory block having a higher density than the first memory block, when the first memory block does not include an empty space capable of storing the first data.

* * * * *